US010248348B2

(12) United States Patent
Yang et al.

(10) Patent No.: US 10,248,348 B2
(45) Date of Patent: Apr. 2, 2019

(54) ONLINE FLASH RESOURCE MIGRATION, ALLOCATION, RETIRE AND REPLACEMENT MANAGER BASED ON A COST OF OWNERSHIP MODEL

(71) Applicant: SAMSUNG ELECTRONICS CO., LTD., Suwon-si, Gyeonggi-do (KR)

(72) Inventors: Zhengyu Yang, Boston, MA (US); Manu Awasthi, San Jose, CA (US); Mrinmoy Ghosh, Milpitas, CA (US); Vijay Balakrishnan, Mountain View, CA (US)

(73) Assignee: Samsung Electronics Co., Ltd. (KR)

( * ) Notice: Subject to any disclaimer, the term of this patent is extended or adjusted under 35 U.S.C. 154(b) by 302 days.

(21) Appl. No.: 15/094,971

(22) Filed: Apr. 8, 2016

(65) Prior Publication Data

US 2017/0046098 A1    Feb. 16, 2017

Related U.S. Application Data

(60) Provisional application No. 62/208,309, filed on Aug. 21, 2015, provisional application No. 62/205,175, filed on Aug. 14, 2015.

(51) Int. Cl.
*G06F 3/06* (2006.01)
*G06Q 10/06* (2012.01)

(52) U.S. Cl.
CPC .......... *G06F 3/0631* (2013.01); *G06F 3/0604* (2013.01); *G06F 3/067* (2013.01); *G06F 3/0616* (2013.01); *G06F 3/0619* (2013.01); *G06F 3/0647* (2013.01); *G06F 3/0652* (2013.01); *G06F 3/0653* (2013.01); *G06F 3/0688* (2013.01); *G06F 3/0689* (2013.01); *G06Q 10/06315* (2013.01)

(58) Field of Classification Search
CPC ...... G06F 3/0619; G06F 3/0616; G06F 3/067; G06F 3/0689; G06F 3/0647; G06F 3/0653; G06F 3/0688; G06F 3/0604; G06F 3/0652; G06Q 10/06315
USPC .................................................. 711/154, 103
See application file for complete search history.

(56) References Cited

U.S. PATENT DOCUMENTS

| | | | |
|---|---|---|---|
| 6,381,619 B1 * | 4/2002 | Borowsky | G06F 17/30289 707/812 |
| 7,496,796 B2 | 2/2009 | Kubo et al. | |
| 8,346,990 B2 | 1/2013 | McKean et al. | |

(Continued)

OTHER PUBLICATIONS

Dushyanth Narayanan et al., "Migrating Server Storage to SSDs: Analysis of Tradeoffs," Proceedings of the 4th ACM European Conference on Computer Systems, Apr. 2009, 14 pages, ACM, Nuremberg, Germany.

*Primary Examiner* — Tuan V Thai
*Assistant Examiner* — Edward Waddy, Jr.
(74) *Attorney, Agent, or Firm* — Innovation Counsel LLP

(57) ABSTRACT

A method for migrating disks includes: dividing a disk pool including a plurality of disks into a random zone and a sequential zone based on sequentiality and randomness of workloads running on the plurality of disks; monitoring a status of each disk in the disk pool based on a total cost of ownership (TCO); migrating one or more workloads of an overheated disk to an idle disk based on the status of each disk. The overheated disk has a first TCO higher than a migration threshold, and the idle disk has a second TCO lower than an idling threshold.

20 Claims, 5 Drawing Sheets

(56) References Cited

U.S. PATENT DOCUMENTS

| | | |
|---|---|---|
| 8,782,340 B2 | 7/2014 | Lary |
| 8,862,845 B2 | 10/2014 | Lary et al. |
| 8,976,636 B1* | 3/2015 | Martin .............. G06F 17/30584 |
| | | 369/30.01 |
| 9,021,231 B2 | 4/2015 | Fitzpatrick et al. |
| 9,146,544 B2* | 9/2015 | Bentivegna ........ G05D 23/1934 |
| 2008/0163239 A1* | 7/2008 | Sugumar ............... G06F 9/5088 |
| | | 718/105 |
| 2010/0122148 A1* | 5/2010 | Flynn .................... G06F 11/108 |
| | | 714/773 |
| 2012/0102350 A1* | 4/2012 | Belluomini ........... G06F 1/3221 |
| | | 713/324 |
| 2014/0074899 A1 | 3/2014 | Halevy et al. |
| 2014/0181813 A1 | 6/2014 | Deshpande et al. |
| 2015/0193154 A1 | 7/2015 | Gong et al. |
| 2016/0092120 A1* | 3/2016 | Liu ....................... G06F 3/0629 |
| | | 711/103 |
| 2016/0283140 A1* | 9/2016 | Kaushik ................ G06F 3/0643 |

\* cited by examiner

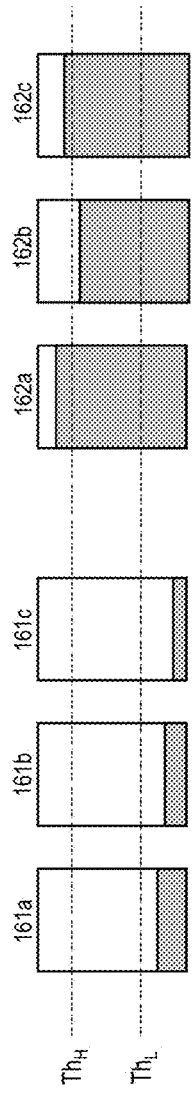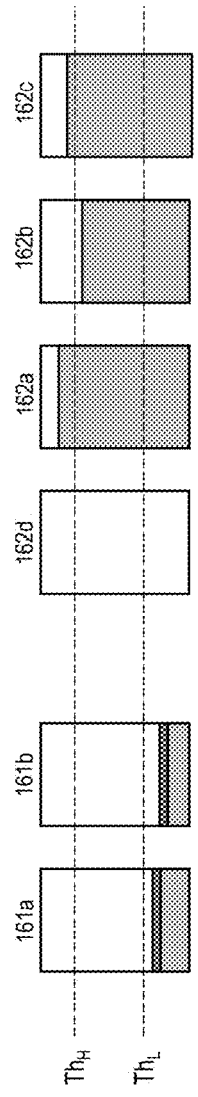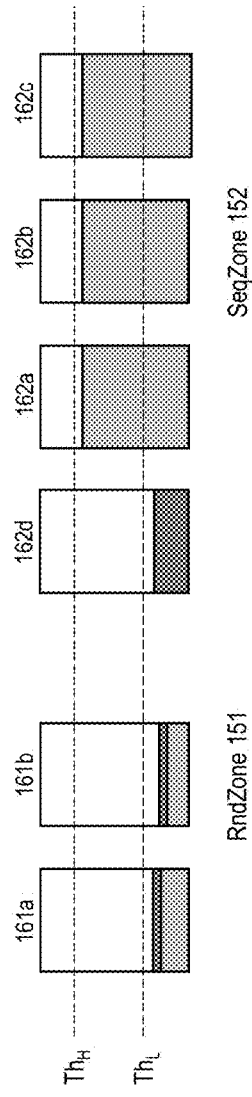

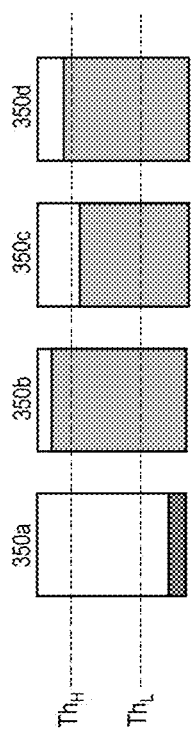
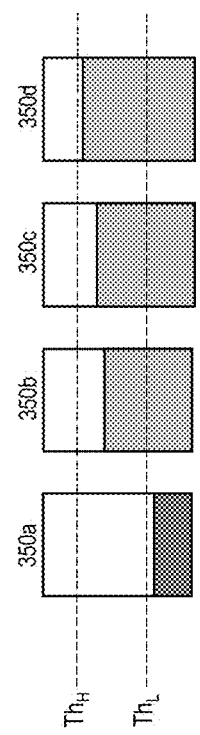
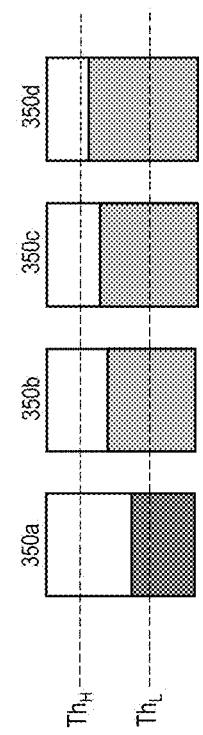

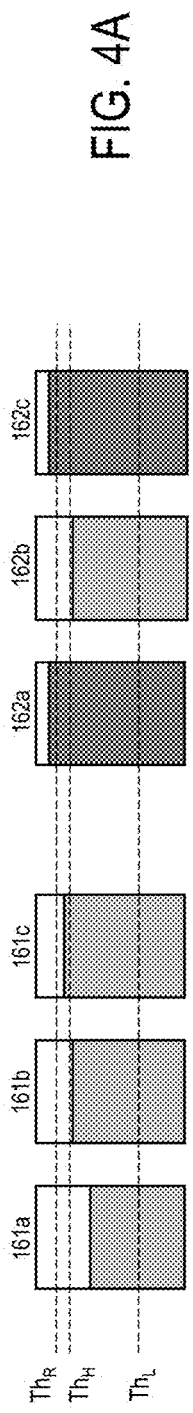
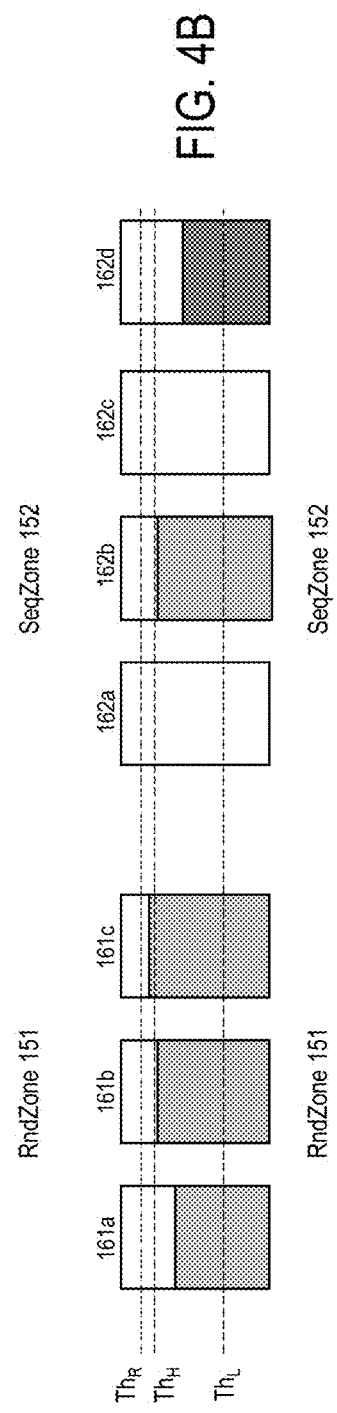
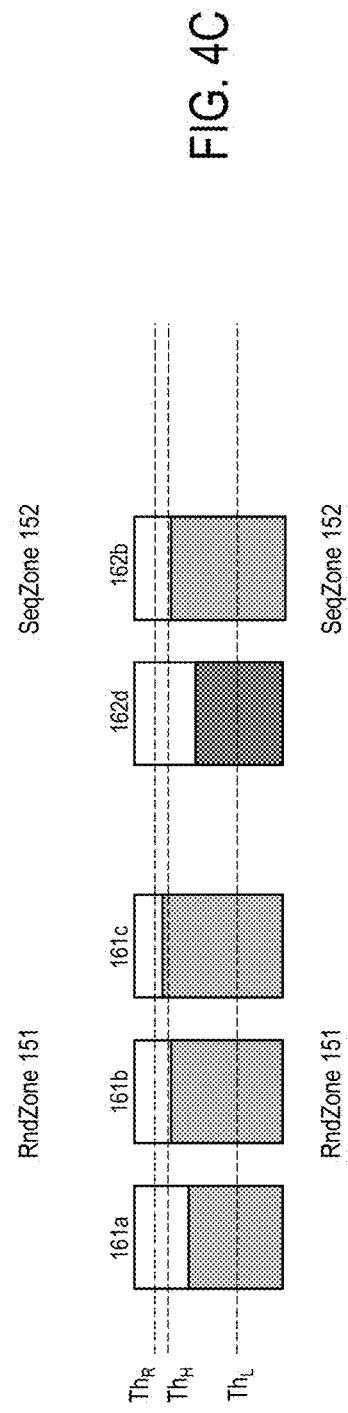

ONLINE FLASH RESOURCE MIGRATION, ALLOCATION, RETIRE AND REPLACEMENT MANAGER BASED ON A COST OF OWNERSHIP MODEL

CROSS-REFERENCE TO RELATED APPLICATION(S)

This application claims the benefits of and priority to U.S. Provisional Patent Application Ser. No. 62/205,175 filed Aug. 14, 2015 and 62/208,309 filed Aug. 21, 2015, the disclosures of which are incorporated herein by reference in their entirety.

TECHNICAL FIELD

The present disclosure relates generally to a data storage system and method, more particularly, to a system and method for migrating, allocating workloads to a plurality of disks in a disk pool, and retiring and replacing disks based on a total cost of ownership (TCO) model.

BACKGROUND

A write amplification factor (WAF) is defined a ratio of physical to logical writes in a non-volatile memory such as a flash-memory. Sequentiality of writes in input/output (I/O) operations has a big impact on write amplification of solid-state drives (SSDs). Increased randomness in a write stream increases the write amplification of the SSDs. Since SSDs have limited write (erase) cycles, a higher WAF caused by randomness in a write stream can shorten the lifetime of the SSDs and thus increase the total cost of ownership (TCO) of a datacenter.

For a given disk pool of SSDs, workloads can be assigned to the SSDs in a fashion such that WAF of individual SSDs in the disk pool is reduced. Sequential write streams are SSD-friendly workloads because they can reduce the WAF, hence the TCO of the datacenter. Mixed write streams including both random write streams and sequential write streams can adversely affect the sequentiality, leading to an increase in both WAF and the TCO.

To balance workloads, a datacenter employs a load-balancer to distribute the workloads to the plurality of disks in the disk pool. Conventional load-balancing mechanism of a datacenter attempts to keep workloads evenly distributed among the disks in a disk pool by invoking a load-balancing algorithm when a load imbalance situation arises.

SUMMARY

According to one embodiment, a method for migrating disks includes: dividing a disk pool including a plurality of disks into a random zone and a sequential zone based on workload sequentiality and randomness of workloads running on the plurality of disks; monitoring a status of each disk in the disk pool based on a total cost of ownership (TCO); migrating one or more workloads of an overheated disk to an idle disk based on the status of each disk. The overheated disk has a first TCO higher than a migration threshold, and the idle disk has a second TCO lower than an idling threshold.

According to another embodiment, a system includes: a plurality of disks in a disk pool, wherein the plurality of disks are divided in a first zone and a second zone based on sequentiality and randomness of workloads running on the plurality of disks; a disk status detector configured to monitor a status of each disk in the disk pool based on a total cost of ownership (TCO); and a migration manger configured to migrate one or more workloads of an overheated disk to an idle disk based on the status of each disk. The overheated disk has a first TCO higher than a migration threshold, and the idle disk has a second TCO lower than an idling threshold.

The above and other preferred features, including various novel details of implementation and combination of events, will now be more particularly described with reference to the accompanying figures and pointed out in the claims. It will be understood that the particular systems and methods described herein are shown by way of illustration only and not as limitations. As will be understood by those skilled in the art, the principles and features described herein may be employed in various and numerous embodiments without departing from the scope of the present disclosure.

BRIEF DESCRIPTION OF THE DRAWINGS

The accompanying drawings, which are included as part of the present specification, illustrate the presently preferred embodiment and together with the general description given above and the detailed description of the preferred embodiment given below serve to explain and teach the principles described herein.

FIG. 2A shows a process for selecting a victim disk in an idle zone, according to one embodiment;

FIG. 2B shows an example process for migrating out, according to one embodiment;

FIG. 2C shows an example process for migrating in, according to one embodiment;

FIG. 3A shows an example case where a migration can occur, according to one embodiment;

FIG. 3B shows an example case for stopping a migration, according to one embodiment;

FIG. 3C shows an example case for stopping a migration, according to another embodiment;

FIG. 4A shows an example process for detecting a candidate disk for retirement, according to one embodiment;

FIG. 4B shows an example process for replacing a retiring disk, according to one embodiment;

FIG. 4C shows an example process for removing retired disks, according to one embodiment.

Figure 1:
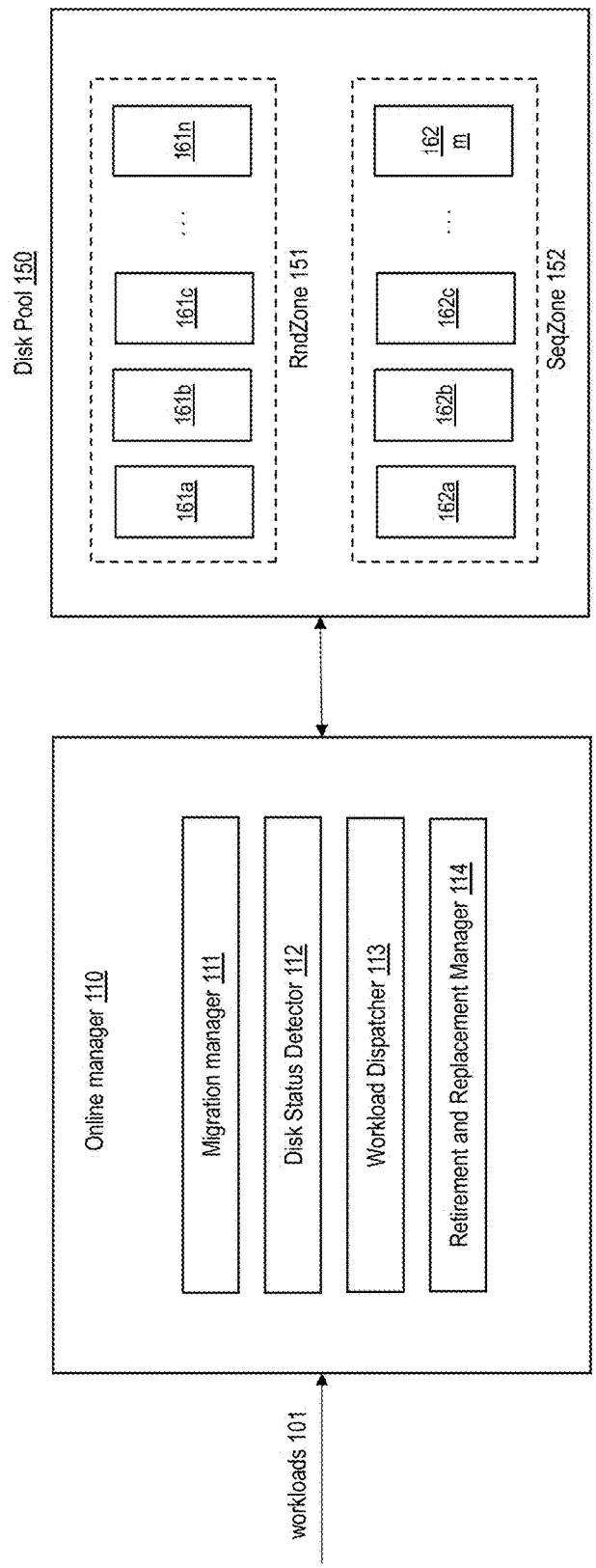
FIG. 1 shows a block diagram of an example data storage system, according to one embodiment.

The figures are not necessarily drawn to scale and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims.

DETAILED DESCRIPTION

Each of the features and teachings disclosed herein can be utilized separately or in conjunction with other features and teachings to provide a system and method for migrating, allocating workloads to a plurality of disks in a disk pool, and retiring and replacing disks based on a total cost of ownership (TCO) model. Representative examples utilizing many of these additional features and teachings, both separately and in combination, are described in further detail with reference to the attached figures. This detailed description is merely intended to teach a person of skill in the art further details for practicing aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

In the description below, for purposes of explanation only, specific nomenclature is set forth to provide a thorough understanding of the present disclosure. However, it will be apparent to one skilled in the art that these specific details are not required to practice the teachings of the present disclosure.

Some portions of the detailed descriptions herein are presented in terms of algorithms and symbolic representations of operations on data bits within a computer memory. These algorithmic descriptions and representations are used by those skilled in the data processing arts to effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms presented herein are not inherently related to any particular computer or other apparatus. Various general-purpose systems, computer servers, or personal computers may be used with programs in accordance with the teachings herein, or it may prove convenient to construct a more specialized apparatus to perform the required method steps. The required structure for a variety of these systems will appear from the description below. It will be appreciated that a variety of programming languages may be used to implement the teachings of the disclosure as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of an original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

The present disclosure describes an online manager that is configured to provide migration, allocation, retirement and replacement of flash resources based on a total cost of ownership (TCO) model. According to one embodiment, the TCO model takes into account various cost factors for operating and maintaining disks in a disk pool, such as a write a lifetime of the disks and replacement costs for the disks. For example, flash memories (or any other non-volatile memories) included in a disk (and therefore in the disk pool) can have (in part) vendor-specific write amplification characteristics, thus the write amplification factor (WAF) for the disk can vary depending on the manufacturer, the storage capacity, the type of the non-volatile memories, and the technologies used to manufacture the non-volatile memories, the operating environment, etc. Because flash memories store data using electrical charges, the stored electrical charges may slowly leak due to imperfect insulation that is often caused by the manufacturing defects or the age of the flash memories. The terms, disk and solid-state drive (SSD), can be interchangeably used herein unless explicitly stated otherwise.

An example online manager according to the disclosed concepts divides a disk storage pool including a plurality of disks into at least two zones that are dedicated to servicing sequential and random traffic workloads. The sizes of these zones are dynamically adaptable to changes in workload characteristics during a runtime by detecting a phase change of the workloads and triggering a migration of the workloads from a disk to another disk. The online manager can further detect failing disks and propose a retirement and replacement of the failing disks.

FIG. 1 shows a block diagram of an example data storage system, according to one embodiment. An online manager 110 can include a migration manager 111, a disk status detector 112, a workload dispatcher 113, and a retirement and replacement manager 114. The online manager 110 continuously receives I/O operations (or workloads 101) from a host computer (not shown) to read, write, and modify data in a plurality of disks in a disk pool 150. The disk pool 150 is divided into a random zone 151 and a sequential zone 152. The random zone 151 includes a first group of disks 161a-161n, and the sequential zone 152 includes a second group of disks 162a-162m. The numbers of the disks contained in the random zone 151 and the sequential zone 152 can be dynamically changed, and aging disks can be retired and replaced with new disks.

According to one embodiment, the migration manager 111 can run a dynamic migration algorithm herein referred to as a minTCO migrator (MTM). The dynamic migration algorithm can detect a disk in realtime that is running write intensive workloads and thus suffering from a relative increase in TCO. The migration manager 111 can distribute the write intensive workloads of the suffering disk to another disk (or disks) to minimize the overall TCO of the data storage system.

According to one embodiment, the migration manager 111 accounts for the WAF characteristics of the disks in the disk pool 150 and can adopt a minTCO algorithm (e.g., minTCO( ) disclosed in the provisional application 62/205,175) to guide migration of the incoming workloads 101. The disk status detector 112 can monitor the status and operating conditions (e.g., the TCO) of each disk. When the disk status detector 112 detects a disk that can minimize the TCO of the workload, the workload dispatcher 113 can allocate the workload to the disk, thereby reducing the overall TCO of the data storage system. The retirement and replacement manager 114 can run a retirement and replacement daemon (RRD) in the background to detect issues with aging disks, remove heavily-worn-out or out-of-work disks and add a new disk (or disks) to the disk pool 150. The retirement and replacement manager 114 can generally keep checking the health of the disks and guide the retirement of aging disks based on a health indicator of the disks. The workload dispatcher 113 can dispatch the workloads 101 to a disk (or disks) that can minimize the overall TCO of the data storage system.

According to one embodiment, the migration manager 111 can trigger a migration of a disk from one zone to another zone (e.g., RndZone 151 to SeqZone 152, or vice versa) when the migration manager 111 determines that the migration can reduce the overall operating cost of the disk despite a migration overhead. Since the migration from one zone to another zone in a disk can have the migration overhead, the migration manager 111 can trigger a migration when the disk's working saturation is imminent.

According to one embodiment, the migration manager 111 can trigger a migration of a disk's workload to another disk when the migration manager 111 determines that the migration can reduce the overall operating cost of the disk despite the migration overhead. Since the migration from a disk to another disk can have a high overhead, the migration manager 111 can perform the migration when the disk pool 150's working saturation is imminent. For example, when a high TCO is expected, or an SSD is getting close to an end of its lifecycle, the migration manager 111 can trigger a migration.

According to one embodiment, the migration manager 111 can migrate workloads 101 (and its associated data) to as few disks as possible. The migration manager 111 can take either a lazy approach and a greedy approach. In either approach, the migration manager 111 can migrate the workloads from a disk that has a high TCO exceeding the migration threshold to a relatively idle disk in the disk pool 150. After the migration occurs and if the TCO of the disk is lowered below the threshold, i.e., exiting an emergency, the migration manager 111 can stop the migration process.

According to one embodiment, the migration manager 111 can migrate an appropriate amount of workloads (i.e., the minimum number of workloads to exit an emergency) from a high TCO disk to a low TCO disk (i.e., an idle disk). Based on this TCO-oriented distribution approach, the data storage system can be auto-balanced when allocating and dispatching new incoming workloads 101.

According to one embodiment, the migration manager 111 can detect a condition that may result in thrashing workloads among certain disks and avoid migration that may cause thrashing. Thrashing can happen when a migration process lowers the TCO of a disk but increases the TCO of another disk. This, in turn, can trigger migration of successive workloads, and is not desirable.

A workload having a high sequential ratio can have a low WAF. To take advantage of the correlation between workload sequentiality and the WAF, the migration manager 111 partitions a disk pool into two zones, i.e., a random zone (RndZone) 151 and a sequential zone (SeqZone) 152. The partitioned zones can avoid a workload 101 having a high sequential ratio from being mixed with another workload 101 having a high random traffic. The mixed workloads can result in an increased TCO because the cost of allocating the workloads may increase. The partitioned disk pool 150 can isolate sequential workloads from random workloads and reduce the WAF, and hence the TCO.

Algorithm 1 below shows example pseudocode for minTCOMigration and other subroutines for implementing the migration manager 111, according to one embodiment. The pseudocode is not intended to be compiled, or to even represent any particular programming language. Instead, it is intended to clearly illustrate the logic and functioning of the algorithm in such a way so that one skilled in the art could embody it in any number of possible programming languages.

---

Algorithm 1: Adaptively Migration Algorithm
Algorithm 1: Migration algorithm

Input: $Z_{Seq}$ and $Z_{Rnd}$ are zones of sequential and random disks respectively.
$D_N$ is the total disk number. $Z_{Seq}$.type = 1 and $Z_{Rnd}$.type = −1.
Initially, len($Z_{Seq}$) = len($Z_{Rnd}$) = 0.5 $D_N$. $Th_H$ and $Th_L$ are two preset migration detection thresholds.

```
1   Procedure minTCOMigration ( )
2       for incoming new job J_N do
3           overheatedZoneType=detect( )
4           if overheatedZoneType != Nil
5               migrate(overheatedZoneType)
6           else if seqCategorize(J_N.S)==1
7               Z_Curr =SeqDiskZone
8           else
9               Z_Curr =RndDiskPool
10          for i in Z_Curr do
11              TCO_List[i]=TCO_Assign(i, J_N)
12          SelectedDisk=TCO_List.minValueIndex( )
13          Disk[SelectedDisk].addJob(J_N)
14      return
15  Procedure detect ( )
16      if AvgTCO(SeqDiskPool)>Th_H and
            AvgTCO(RandDiskPool)<Th_L
17          return 1
18      else if AvgTCO(RandDiskPool)>Th_H and
            AvgTCO(SeqDiskPool)<Th_L
19          return −1
20      else
21          return Nil
22  Procedure migrate (overheatedPoolType)
23      i=Pool[-overheatedPoolType].minTCODiskID()
24      Pool[-overheatedPoolType].migrateOutAllJobs(i)
25      Disk[i].type=overheatedPoolType
26      Pool[-overheatedPoolType].remove(i)
27      Pool[overheatedPoolType].add(i)
28      Pool [overheatedPoolType].migrateToEmptyDisk(i)
29      return
30  Procedure migrateOutAllJobs (i)
31      RemdDisks=Pool[Disk[i].type].exclude(i)
32      Jobs=Disk[i].ZToASortJobByRate()
33      for k=1 to len(Jobs)
34          RemdDisks.minTCODisk().add(Jobs[k])
35      return
36  Procedure migrateToEmptyDisk(i)
37      RemdDisks=Pool[Disk[i].type].exclude(i)
38      while FreeDisk.TCO() <= Th_L and Reminder.maxTCO()
            >= Th_H do
39          J_C =RemdDisks.maxTCODisk().maxJobRate()
40          RemdDisks.maxTCODisk().remove(J_C)
41          Disk[i].add(J_C)
42      return
```

---

Lines 6 to 9 of Algorithm 1 show that a workload is assigned to a zone based on the sequentiality of the workload. In lines 10 to 13 of Algorithm 1, a TCO-minimization (e.g., minTCO( ) disclosed in the provisional application 62/205,175) scheme is applied to estimate a TCO for each disk in the current zone and detect a disk that can minimize the TCO. The workload dispatcher 113 can send the workload to the disk that can minimize the TCO. Initially, the sizes of the random zone 151 and the sequential zone 152 are set as a half of the total size of the disk pool 150. It is noted that the fixed size for the two zones may not necessarily be the best solution for all cases and operating conditions. Therefore, the migration manager 111 can adaptively adjust the sizes of the two zones according to the characteristics of incoming workloads, as and when the incoming workloads arrive.

For example, the migration algorithm shown in Algorithm 1 shows that the size of each zone can be adjusted by converting a victim disk (VictimDisk) from an idle zone (IdleZone) to an overheated zone (OverheatedZone). The prefixes "Rnd" (random) and "Seq" (sequential) as in RndZone and SeqZone indicate the type of zones while the prefixes "Idle" and "Overheated" indicate the status of the zones. To achieve that, the migration manager 111 can migrate some or all of the workloads from the victim disk to one or more disks in the same zone. The migration manager 111 can then migrate the workloads from the overheated zone to the victim disk.

According to one embodiment, the migration manager 111 can perform a migration based on several factors. Examples of such migration-decision factors include, but are not limited to, a migration mode (e.g., a lazy mode or a greedy mode), sensing metrics that measure a saturation condition (herein also referred to as a "temperature" (e.g., TCO)) of disks and zones, migration and idling thresholds $Th_H$ and $Th_L$, and trigger conditions. The migration manager 111 can select a disk in one zone and perform a migration from a disk in a different zone to the selected disk.

The migration manager 111 can detect a saturation condition or sensing metrics of a disk and a zone of disks. In one embodiment, the sensing metrics is (or can be combined into) a TCO. The saturation condition is herein also referred to as a temperature. For the similar reason, a disk that has a TCO higher than the threshold $Th_H$ is referred to as an overheated disk. Although the present example describes a saturated condition of a disk as a temperature or a status of being overheated, it is understood that any sensing metric of a disk or a zone can be used to represent a saturation condition or a status without deviating from the present disclosure.

The migration manager 111 can run based on two predetermined thresholds $Th_H$ and $Th_L$. The threshold $Th_H$ is used for detecting an overheating condition. If the TCO of a disk that is higher than the threshold $Th_H$, it indicates that the disk is suffering from write intensive workloads and can cause an emergency. The migration manager 111 can trigger migration from the overheated disk. On the other hand, the threshold $Th_L$ is used for detecting an idle disk. Those disks with the TCO less than the threshold $Th_L$ are good candidates to be a destination of the migration. The use of the two thresholds $Th_H$ and $Th_L$ can avoid thrashing. In some embodiments, the two thresholds $Th_H$ and $Th_L$ can be used for calculating a TCO of a single disk or a single zone.

Conventional load-balancing mechanism of a datacenter attempts to evenly distribute workloads among the disks in a disk pool. In addition to keeping the storage system load-balanced, the migration manager 111 can trigger a migration from an overheated disk to an idle disk in two different modes, a lazy mode and a greedy mode.

In the lazy mode, the migration manager 111 can trigger a migration only when a new workload arrives. In one embodiment, the migration in the lazy mode can be an inter-zone disk-based migration rather than performing an intra-zone disk load-balancing. Both of the inter-zone disk-based migration and the intra-zone disk load-balancing rely on the migration manager 111 to automatically balance workloads within a zone during a runtime.

In the greedy mode, the migration manager 111 can assign an idle disk to accept a workload in place of a disk that has a high write rates that can cause an overheating condition. The idle disk may or may not have a TCO lower than the threshold $Th_L$. Once the overheating situation is resolved, i.e., the TCO of the overheated disk is lowered below the threshold $Th_L$, the migration manager 11 can stop migration from the overheated disk.

When new workloads arrive, they can be added to a queue before being allocated to the disks in the disk pool 150. The migration manager 111 first checks if the average TCO of the any zone (either the random zone 151 or the sequential zone 152) is greater than the threshold $Th_H$. If so, the migration manager 111 zone labels it as an overheated zone. In this case, the migration manager 111 can trigger rezoning of the two zones by trying to find a relatively idle disk from the other zone (idle zone) that has an average TCO less than the threshold $Th_L$. The relatively idle disk in the idle zone is referred to as a victim disk. If the other zone is not qualified as an idle zone, the migration manager 111 may not trigger a migration. The migration aims to balance the utilization of the zones in terms of the TCO and make the partition suitable for the current workloads. Once the relatively idle disk is identified in the idle zone, the migration manager 111 can migrate the workloads executing on the idle disk to other disks in the idle zone, remove the idle disk from the idle zone, and add it to the overheated zone. This process is referred to as rezoning. Once the rezoning is complete, the migration manager 111 can migrate some or all of the workloads from the disk (or disks) in the overheated zone to the newly added disk until the average TCOs of the disks in the overheated zone are lowered below the threshold $Th_H$, or the TCO of the victim disk is raised higher than the threshold $Th_L$. If the TCO of the victim disk is raised higher than the threshold $Th_L$, the victim disk is no longer qualified as an idle disk. In the case where there are no victim disks available and there still exist overheated workloads in the overheated zone, the migration manager 111 can continue to rescue the overheated disks by migrating the overheated workloads to a relatively idle disk in the idle zone even if its TCO is higher than the threshold $Th_L$.

According to one embodiment, the migration manager 111 can perform a migration process in three phases. FIGS. 2A-2C show an example migration process in the three phases. The first phase of the migration process is to detect a victim disk in an idle zone and an overheated disk in an overheated zone. The second phase of the migration process is to migrate out all workloads from the victim disk. The third phase of the migration process is a migration in some or all of the workloads from the overheated disk to the victim disk.

In the first phase of the migration process, the migration manager 111 can monitor the TCOs of the disks in the disk pool and select an overheated zone that has an average TCO higher than the threshold $Th_H$. In one embodiment, the migration manager 111 can migrate workloads and disks in a lazy mode. In the lazy mode, the migration manager 111 detects a migration condition when a new workload arrives and awaits for a disk allocation for the new workload. Referring to line 3 of Algorithm 1, the subroutine detect of the migration manager 111 can calculate the TCOs of all the disks in a disk pool and detect an overheated zone that has an average TCO higher than the threshold $Th_H$. Referring to lines 15 to 21 of Algorithm 1, the subroutine detect compares TCOs with the threshold $Th_H$ and return an overheated zone if there is any. Next, the migration manager 111 can select a victim disk in an idle zone. Referring to line 23 of Algorithm 1, the migration manager 111 can select a disk that has the lowest TCO in the idle zone as the victim disk ( ).

FIG. 2A shows a process for selecting a victim disk in the idle zone, according to one embodiment. In the present example, the overheated zone is the sequential zone 152, and the idle zone is the random zone 151. In other examples, the overheated zone can be the random zone 151, and the idle zone is the sequential zone 152. In the sequential zone 152 that is overheated, there is at least one disk that has the TCO higher than the threshold $Th_H$. In the present example, the disks 162a and 162c have the TCO higher than the threshold $Th_H$, therefore the disk status detector 112 determines that the disks 162 and 162c are overheated. In the random zone 151, there exists at least one disk that has the TCO lower than the threshold $Th_L$, therefore the disk status detector 112 determines that there exists an idle zone, in the present example, in the random zone 151. The disk 161c has the lowest TCO, therefore the migration manager 111 selects the disk 161c as a victim disk.

In the second phase of the migration process, the migration manager 111 can migrate out all workloads from the victim disk to one or more other disks in the idle zone. Referring to line 24 and lines 30 to 35 of Algorithm 1, the subroutine migrateOutAllJobs migrates out all workloads of the victim disk that is identified in the first phase of the migration process. The migration manager 111 can sort all existing workloads in the victim disk (line 32 of Algorithm 1) and send the workloads with a high write rate to a disk that has the minimum TCO in the idle zone. This process is referred to as a greedy migration. The greedy migration process can help to rebalance the disks in the idle zone quickly. It is noted that the greedy migration process may damage the other idle disks and cause them to overheat such that the TCO of the other idle disks is raised over the threshold $Th_H$. To avoid such a thrashing situation where a migration from one disk can immediately lead to an overheating condition for other disks, the migration manager 111 can appropriately set the thresholds $Th_H$ and $Th_L$. If an overheating condition occurs in a rare occasion after a migration process, the retirement and replacement manager 114 can respond to resolve the overheating condition by retiring and replacing an aging disk, as will be discussed in further detail below.

FIG. 2B shows an example process for migrating out, according to one embodiment. The workloads of the disk 161c (i.e., the victim disk according to FIG. 2A) are migrated to other disks 161a and 161b in the idle zone (the random zone 151) that have a TCO lower than the threshold $Th_L$. This process frees up the victim disk 161c, and the victim disk 161c is moved to the overheated zone (the sequential zone 152) and labeled as a new disk 162d.

In the third and last phase of the migration process, the migration manager 111 can migrate some or all workloads from the overheated disks in the overheated zone into the converted victim disk. After the victim disk is converted to the overheated zone (line 25 to 27 of Algorithm 1), the converted victim disk is ready to accept workloads migrated from the overheated disks in the overheated zone (line 28 of Algorithm 1).

FIG. 2C shows an example process for migrating in, according to one embodiment. Some of the workloads of the overheated disks 162a and 162c are migrated to the new disk 162d in the overheated zone, in the present example, the sequential zone 152). The migration from the overheated disks 162a and 162c to the new disk 162 continues until the TCO of the overheated disks 162a and 162c are lowered below the threshold $Th_H$.

The migration manager 111 can migrate workloads from the overheated disks to the newly converted disk (the victim disk) when one of the following conditions is satisfied: (1) the TCO of the victim disk remains below the threshold $Th_H$, and (2) there exist disks with a TCO higher than the threshold $Th_H$ in the overheated zone. The first condition ensures that the victim disk does not overheat due to the migration and that a free disk is in a relatively idle mode so that the free disk has a high chance to be able to accept new workloads without being overheated. The second condition ensures that the migration manager 111 migrates workloads only from the overheated disks. The migration manager 111 uses these two conditions when performing migrations with a goal to reduce the number of workloads that need to be migrated as much as possible while solving an overheating condition.

FIGS. 3A-3C show example cases for migrating workloads to a free disk. FIG. 3A shows an example case where a migration can occur, according to one embodiment. The disks 350a-350d can be the disks that belong to either the random zone 151 or the sequential zone 152. In the present example, the disks 350b and 350d are overheated having a TCO higher than the threshold $Th_H$. The migration manager 111 selects the disk 350a as a victim disk because it has a TCO lower than the threshold $Th_L$ indicating that the disk 350a has a high chance to be able to migrate the workloads of the overheated disks 350b and 350d without causing a thrashing situation.

The subroutine migrateToEmptyDisk shown in line 28 and lines 36 to 42 of Algorithm 1 determines that there exists an idle disk (e.g., 350a in FIG. 3A) that overheated disks can migrate to. The migration manager 111 can greedily pick the maximum workload rate (maxWorkloadRate) on the disk that has the highest TCO (maxTCODisk) and migrate the disk (maxTCODisk) to the idle disk.

FIG. 3B shows an example case for stopping a migration, according to one embodiment. In this case, the migration manager 111 stops the migration because all of the overheated disks 350b and 350d are migrated to the victim disk 350a so that the TCOs of the overheated disks 350b and 350d are lowered below the threshold $Th_H$.

FIG. 3C shows an example case for stopping a migration, according to another embodiment. In this case, the migration manager 111 may stop the migration because the newly converted victim disk is no longer an idle disk because the TCO of the converted victim disk is raised above the threshold $Th_L$. This condition ensures that the migration manager 111 makes a decision to migrate as few as workloads as possible to the idle disk until the TCO of the overheated disk is lowered below the threshold $Th_H$. If all of the overheated disks cannot be migrated to the idle disk, the migration manager 111 can just greedily decrease the TCO of the overheated disks as much as possible by continuing the migration of the workloads in the overheated disks to other relatively idle disks even if the relatively idle disks may have a TCO higher than the threshold $Th_L$ but lower than the threshold $Th_H$ threshold $Th_H$.

The term "retirement" can be defined as removing a disk from a disk pool. The term "replace" can be defined as inserting one or more new disks into the disk pool. The term "write wearout" of an SSD refers to a condition that the disk is close to its physical write limit or the disk is physically broken. Even though an old disk may have a certain amount of remaining write cycles, a new replacement disk (or disks)

may have a cheaper TCO from the perspective of the operator of the data storage system. The retirement and replacement process can reduce the overall TCO instead of continuing to use the old disk. A new replacement disk (or disks) can solve the issue of "all overheated and no idle disks" since after a long working period, all SSDs are inevitably getting old and can become overheated when new workloads keep coming. It is noted that the number of replaced disks can be the same as or different from the number of retired disks.

Algorithm 2 below shows example pseudocode for a retirement and replacement algorithm, according to one embodiment. The pseudocode is not intended to be compiled, or to even represent any particular programming language. Instead, it is intended to clearly illustrate the logic and functioning of the algorithm in such a way so that one skilled in the art could embody it in any number of possible programming languages.

Algorithm 2: Retire and Replace Daemon
Algorithm 2: Retirement and replacement algorithm Input: $Th_H$, $Th_L$ are thresholds in migration.
$Th_R$ is the threshold for retirement.
$T_{PD}$ is the daemon checking period time.
1  Procedure retireDaemon ( )
2      while True do
3          Sleep($T_{PD}$)
4          for each Zone do
5              RetDisks=checkRetire()
6              RemdDisks=Zone.exclude(RetDisks)
7              while RetDisks.jobQueue != Nil do
8                  if DN=Nil OR DN.TCO() >= $Th_H$
9                      $D_N$=getANewDisk()
10                     $D_N$.type=Zone.type
11                     Zone.add($D_N$)
12                     RemdDisks.add($D_N$)
13                 $J_C$=RetDisks.maxJobRate()
14                 RetDisks.maxJobRateDisk().remove($J_C$)
15                 RemdDisks.minTCODisk().add($J_C$)
16             for each $D_R$ in RetDisks do
17                 retire($D_R$)
18         return
19 Procedure checkRetire ( )
20     for each disk i do
21         if TCO(i)>$Th_R$ OR $w_i$=99% * Wi OR Disk[i] does not work
22             RetDisks.add(i)
23     return RetDisks
24 Procedure retire ( )
25     Zone[Disk[i].type].remove(i)
26     return According to one embodiment, the retirement and replacement manager 114 can run a retirement and replacement daemon (RRD) in the background. The RRD can periodically check the health status of each disk in the disk pool 150. Referring to lines 5 and from 19 to 23 of Algorithm 2, the subroutine checkRetire checks a retirement condition for a disk. The retirement and replacement manager 114 can determine when to retire a disk according to one of the following conditions: (i) the TCO of a disk is higher than a predetermined retirement threshold $Th_R$, (ii) total number of writes incurred to the disk is getting close to the allowed total write limitation for a disk (e.g., 99% of the total write limitation), and (iii) the SSD is physically broken or out-of-service. It is noted that other conditions may be used to determine a retirement of a disk without deviating from the scope of the present disclosure.

Adding a new disk can be costly in terms of the TCO. The retirement and replacement manager 114 can solve a retirement problem by adding as few new disks as possible.

Referring to lines 13 to 15 of Algorithm 2, the retirement and replacement manager 114 can greedily migrate the workloads of a retiring disk to other disks in the same zone. When all workloads from the retiring disk are migrated out and sent to existing or new disks in the same zone, the retirement and replacement manager 114 can eventually retire the retiring disk (line 16 to 17 of Algorithm 2). The number of new disks is not required to be the same as the number of retired disks as long as the workloads from the retiring disk can be successfully migrated out without causing thrashing, and the TCOs of the new disks are lower than the $Th_H$ (line 8 of Algorithm 2). In this sense, the retirement and replacement manager 114 can adaptively add or reduce the number of disks based on the characteristics of the incoming workloads such as the sequentiality.

FIGS. 4A-4C show an example retirement and replacement process. FIG. 4A shows an example process for detecting a candidate disk for retirement, according to one embodiment. In the present example, the disks 162a and 162c in the sequential zone 152 have a TCO higher than the retirement threshold $Th_R$. Although the present example shows that the retirement threshold $Th_R$ is higher the threshold $Th_H$ and the threshold $Th_L$, it is understood that the retirement threshold $Th_R$ can be of any value that is determined by the retirement and replacement manager 114. In one embodiment, the retirement and replacement manager 114 can determine that the disks 162a and 162c need to be retired and replaced based on their TCOs. In other embodiments, the retirement threshold $Th_R$ may be determined based on a different metric from the metric (e.g., TCO) that determines the migration threshold $Th_H$ and the idling threshold $Th_L$.

FIG. 4B shows an example process for replacing a retiring disk, according to one embodiment. A new disk 162d is added to the sequential zone 152 where the retiring disks are located to migrate the workloads of the retiring disks 162a and 162c. After the migration, all of the workloads in the retiring disks 162a and 162c are migrated to the new disk 162d, and the retiring disks 162a and 162c are emptied. In some embodiments, the disk 162d may be a newly added disk or a disk that is converted from the same zone (the sequential zone 152) or the other zone (the random zone 151).

FIG. 4C shows an example process for removing retired disks, according to one embodiment. The retiring disks 162a and 162c are removed from the sequential zone 152 to complete the retirement and replacement process. After the retirement and replacement, all the remaining (the disks 162b and 162d) in the sequential zone 152 have a TCO lower than the thresholds $Th_R$ and $Th_H$. In the random zone 151, the disk 161c has the TCO higher than the threshold $Th_H$ but lower than the threshold $Th_R$. The migration manager 111 may migrate the overheated disk 161c when at least a disk that has a TCO lower than the threshold $Th_L$ becomes available or a new disk is added to the sequential zone 151.

Figure 5:
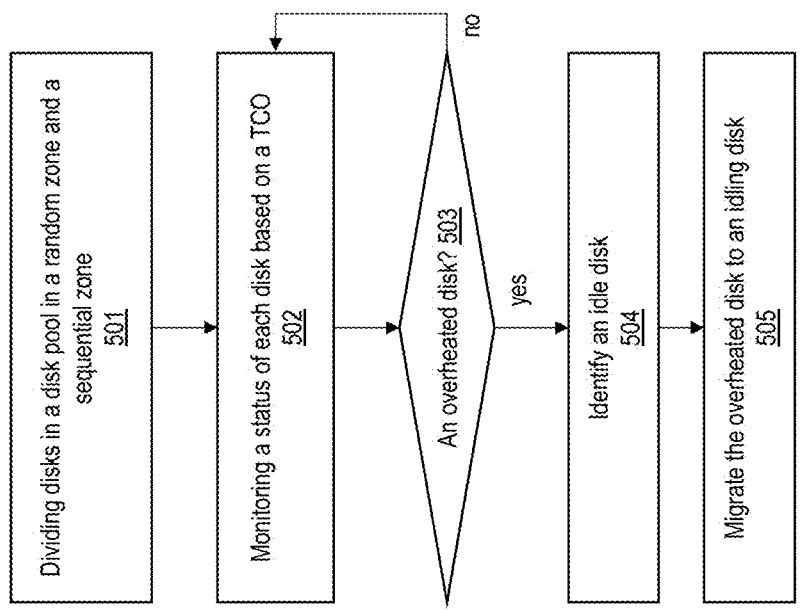
FIG. 5 shows an example flowchart for migrating disks, according to one embodiment.

FIG. 5 shows an example flowchart for migrating disks, according to one embodiment. The online manager 110 divides a disk pool including disks into a random zone and a sequential zone based on workload sequentiality and randomness of workloads that are running on the disks (step 501). The disk status detector 112 monitors the status and operating conditions (e.g., the TCO) of each disk (step 502). Based on the status and operating conditions of each disk, the migration manager 111 can determine that a disk is overheating (step 503). The disk status detector 112 identifies an idle disk that can minimize the TCO of the workload (step 504). The workload dispatcher 113 allocates one or more workloads of the overheated disk to the idle disk (step 505).

According to one embodiment, a method for migrating disks includes: dividing a disk pool including a plurality of disks into a random zone and a sequential zone based on workload sequentiality and randomness of workloads running on the plurality of disks; monitoring a status of each disk in the disk pool based on a total cost of ownership (TCO); migrating one or more workloads of an overheated disk to an idle disk based on the status of each disk. The overheated disk has a first TCO higher than a migration threshold, and the idle disk has a second TCO lower than an idling threshold.

The one or more workloads of the overheated disk may be migrated to the idle disk in a lazy mode when a new workload arrives.

The method may further include: detecting an idle disk that has the lowest TCO in a first zone of the random zone and the sequential zone; migrating one or more workloads of the idle disk to one or more other disks in the first zone; converting the idle disk to a second zone of the random zone and the sequential zone; and migrating the one or more workloads of the overheated disk in the second zone to the idle disk that is converted from the first zone to the second zone.

The one or more workloads of the overheated disk may be migrated to the idle disk in a greedy mode.

The one or more workloads of the overheated disk may be migrated to the idle disk until the TCO of the overheated disk is lowered below the migration threshold.

The one or more workloads of the overheated disk may be migrated to the idle disk until the TCO of the idle disk is higher than the idling threshold.

The method may further include: detecting a retiring disk that has a TCO higher than a retirement threshold; adding a replacement disk to a zone where the retiring disk is detected; migrating all workloads of the retiring disk to the replacement disk; and retiring the retiring disk from the zone.

The retirement threshold may be higher than the migration threshold.

The overheated disk and the idle disk may be located in the same zone.

The method may further include detecting the retiring disk in a background process while new workloads are received.

According to another embodiment, a system includes: a plurality of disks in a disk pool, wherein the plurality of disks are divided in a first zone and a second zone based on sequentiality and randomness of workloads running on the plurality of disks; a disk status detector configured to monitor a status of each disk in the disk pool based on a total cost of ownership (TCO); and a migration manger configured to migrate one or more workloads of an overheated disk to an idle disk based on the status of each disk. The overheated disk has a first TCO higher than a migration threshold, and the idle disk has a second TCO lower than an idling threshold.

The one or more workloads of the overheated disk may be migrated to the idle disk in a lazy mode when a new workload arrives.

The disk status detector may be further configured to detecting an idle disk that has the lowest TCO in the first zone. The migration manager may be further configured to: migrate one or more workloads of the idle disk to one or more other disks in the first zone; convert the idle disk to a second zone of the random zone and the sequential zone; and migrate the one or more workloads of the overheated disk in the second zone to the idle disk that is converted from the first zone to the second zone.

The one or more workloads of the overheated disk may be migrated to the idle disk in a greedy mode.

The one or more workloads of the overheated disk may be migrated to the idle disk until the TCO of the overheated disk is lowered below the migration threshold.

The one or more workloads of the overheated disk may be migrated to the idle disk until the TCO of the idle disk is higher than the idling threshold.

The system may further include a retirement and replacement manager that is configured to: detect a retiring disk that has a TCO higher than a retirement threshold; add a replacement disk to a zone where the retiring disk is detected; migrate all workloads of the retiring disk to the replacement disk; and retire the retiring disk from the zone.

The retirement threshold may be higher than the migration threshold.

The overheated disk and the idle disk may be located in the same zone.

The retirement and replacement manager may be further configured to detect the retiring disk in a background process while new workloads are received.

The above example embodiments have been described hereinabove to illustrate various embodiments of implementing a system and method for interfacing co-processors and input/output devices via a main memory system. Various modifications and departures from the disclosed example embodiments will occur to those having ordinary skill in the art. The subject matter that is intended to be within the scope of the invention is set forth in the following claims.

What is claimed is:

1. A method comprising:
    dividing a disk pool including a plurality of disks into a random zone and a sequential zone based on workload sequentiality and randomness of workloads running on the plurality of disks;
    monitoring a status of each disk in the disk pool based on a total cost of ownership (TCO) model that calculates a plurality of cost factors for operating and maintaining the each disk in the disk pool including at least a write amplification factor (WAF) and a replacement cost of the each disk;
    identifying an overheated disk and an idle disk among the plurality of disks based on the status of each disk in the disk pool, wherein the overheated disk has a first TCO that is higher than a migration threshold indicating that the overheated disk has a higher degree of write intensive workloads, wherein the idle disk has a second TCO that is lower than an idling threshold, and wherein the idling threshold is lower than the migration threshold; and
    migrating one or more workloads of the overheated disk to the idle disk based on the status of each disk and reducing the total cost of ownership for operating the plurality of disks in the disk pool.

2. The method of claim 1, wherein the one or more workloads of the overheated disk are migrated to the idle disk in a lazy mode when a new workload arrives.

3. The method of claim 1, further comprising:
    detecting the idle disk in a first zone selected from the random zone and the sequential zone;
    migrating one or more workloads of the idle disk to one or more other disks in the first zone;

converting the idle disk from the first zone to a second zone of the random zone and the sequential zone that is different from the first zone; and migrating the one or more workloads of the overheated disk in the second zone to the idle disk that is converted from the first zone to the second zone.

4. The method of claim 3, wherein the one or more workloads of the overheated disk are migrated to the idle disk in a greedy mode.

5. The method of claim 1, wherein the one or more workloads of the overheated disk are migrated to the idle disk until the TCO of the overheated disk is lowered below the migration threshold.

6. The method of claim 1, wherein the one or more workloads of the overheated disk are migrated to the idle disk until the TCO of the idle disk is higher than the idling threshold.

7. The method of claim 1, further comprising:
detecting a retiring disk that has a TCO higher than a retirement threshold that indicates that a cost of continually operating the retiring disk exceeds a cost of replacing the retiring disk with a replacement disk and operating the replacement disk;
adding the replacement disk to a zone where the retiring disk is detected;
migrating all workloads of the retiring disk to the replacement disk; and
retiring the retiring disk from the zone.

8. The method of claim 7, wherein the retirement threshold is higher than the migration threshold.

9. The method of claim 3, wherein the overheated disk and the idle disk are located in the same zone.

10. The method of claim 7, further comprising detecting the retiring disk in a background process while new workloads are received.

11. A system comprising:
a plurality of disks in a disk pool, wherein the plurality of disks are divided into a first zone and a second zone based on sequentiality and randomness of workloads running on the plurality of disks;
a disk status detector configured to monitor a status of each disk in the disk pool based on a total cost of ownership (TCO) model that calculates a plurality of cost factors for operating and maintaining the each disk in the disk pool including at least a write amplification factor (WAF) and a replacement cost of the each disk; and
a migration manger configured to identify an overheated disk and an idle disk among the plurality of disks based on the status of each disk in the disk pool and migrate one or more workloads of the overheated disk to the idle disk based on the status of each disk to and reduce the total cost of ownership for operating the plurality of disks in the disk pool, wherein the overheated disk has a first TCO that is higher than a migration threshold indicating that the overheated disk has a higher degree of write intensive workloads, wherein the idle disk has a second TCO that is lower than an idling threshold, and wherein the idling threshold is lower than the migration threshold.

12. The system of claim 11, wherein the one or more workloads of the overheated disk are migrated to the idle disk in a lazy mode when a new workload arrives.

13. The system of claim 11, wherein the disk status detector further is configured to detect the idle disk in the first zone, and
wherein the migration manage is further configured to:
migrate one or more workloads of the idle disk to one or more other disks in the first zone;
convert the idle disk from the first zone to a second zone; and
migrate the one or more workloads of the overheated disk in the second zone to the idle disk that is converted from the first zone to the second zone.

14. The system of claim 13, wherein the one or more workloads of the overheated disk are migrated to the idle disk in a greedy mode.

15. The system of claim 11, wherein the one or more workloads of the overheated disk are migrated to the idle disk until the TCO of the overheated disk is lowered below the migration threshold.

16. The system of claim 11, wherein the one or more workloads of the overheated disk are migrated to the idle disk until the TCO of the idle disk is higher than the idling threshold.

17. The system of claim 11 further comprising a retirement and replacement manager that is configured to:
detect a retiring disk that has a TCO higher than a retirement threshold that indicates that a cost of continually operating the retiring disk exceeds a cost of replacing the retiring disk with a replacement disk and operating the replacement disk;
add the replacement disk to a zone where the retiring disk is detected;
migrate all workloads of the retiring disk to the replacement disk; and
retire the retiring disk from the zone.

18. The system of claim 17, wherein the retirement threshold is higher than the migration threshold.

19. The system of claim 13, the overheated disk and the idle disk are located in the same zone.

20. The system of claim 17, wherein the retirement and replacement manager is further configured to detect the retiring disk in a background process while new workloads are received.

* * * * *